United States Patent [19]

Ogata et al.

[11] Patent Number: 5,376,597
[45] Date of Patent: Dec. 27, 1994

[54] LEAD-FREE GLASS COMPOSITION HAVING PROPERTIES SIMILAR TO LEAD CRYSTAL GLASS

[75] Inventors: Haruhiko Ogata, Kanagawa; Hidetoshi Komiya, Tokyo; Shizue Inaba, Kanagawa, all of Japan

[73] Assignee: Toyo Glass Company Limited, Tokyo, Japan

[21] Appl. No.: 138,062

[22] Filed: Oct. 20, 1993

[30] Foreign Application Priority Data

Oct. 20, 1992 [JP] Japan ................... 4-306222
Jun. 30, 1993 [JP] Japan ................... 5-183375

[51] Int. Cl.$^5$ ................ C03C 3/089; C03C 3/078
[52] U.S. Cl. ........................... 501/72; 501/65; 501/903
[58] Field of Search ................ 501/72, 65, 903

[56] References Cited

U.S. PATENT DOCUMENTS 4,002,482  1/1977  Coenen ........................ 501/72
4,562,161  12/1985  Mennemann et al. ........ 501/65
4,732,794  3/1988  Hyde ............................ 501/72

FOREIGN PATENT DOCUMENTS 0060641  4/1983  Japan ........................ 501/72
2141434  5/1990  Japan .................... C03B 9/06
3205325  9/1991  Japan ................... C03C 17/23
450133   2/1992  Japan ................... C03C 3/102

*Primary Examiner*—Karl Group
*Assistant Examiner*—Deborah Jones
*Attorney, Agent, or Firm*—Sughrue, Mion, Zinn, Macpeak & Seas

[57] ABSTRACT

A glass composition is disclosed wherein the density and the refraction index and the dispersion value of light are equal to or higher than those of conventional lead-containing crystal glass while no lead is contained therein at all. The glass composition comprises 50 to 60 % by weight of $SiO_2$, 5 to 13 % by weight of $K_2O$, 5 to 8 % by weight of $TiO_2$, 10 to 15 % by weight of BaO, 5 to 10 % by weight of ZnO, 3 to 10 % by weight of $Na_2O$, 1 to 5 % by weight of CaO and 0.3 to 0.8 % by weight of $Sb_2O_3$.

2 Claims, No Drawings

LEAD-FREE GLASS COMPOSITION HAVING PROPERTIES SIMILAR TO LEAD CRYSTAL GLASS

BACKGROUND OF THE INVENTION

1. Field of the Invention

This invention relates to a glass composition which looks like or can be regarded as crystal glass although it does not contain lead (Pb) and is suitable for use to produce tableware or like articles.

2. Description of the Related Art

Conventionally, lead-containing crystal glass is used popularly as crystal glass for use to produce tableware or like articles. The glass contains a large amount of lead, and the characteristics of it, in short, such characteristics that "it is massive", that "it has a high light refraction index and exhibits a high dispersion value of light" and that "it melts readily", are provided principally by PbO. While the content of PbO varies widely, it generally ranges from 24 to 26 percent by weight.

However, it has come into question recently that lead, which is particularly injurious to the human bodies, undergoes dissolution from lead-containing crystal glass. For example, in California, U.S.A., a complaint was filed asserting that the public organization "has not given a clear warning against exposure to lead" arising from lead crystal glass used to produce tableware, decanters and like articles. According to the FDA (Food and Drug Administration) standards of the U.S.A., the regulated value for the dissolution amount of lead has been revised to a severe value.

Meanwhile, in Japan, the dissolution amount of lead from lead-containing crystal glass is regulated in the "Official Announcement No. 84 of the Ministry of Health and Welfare Based on the Food Hygiene Law", and lead-containing crystal glassware makers manufacture lead-containing crystal glass so that the dissolution amount of lead may not exceed the regulated value even where the content of PbO in the lead-containing crystal glass is within 24 to 26 percent. However, it is forecast that the regulated value may be restricted to a progressively severe value in Japan.

Therefore, in order to suppress dissolution or lead from lead-containing crystal glass, Japanese Patent Laid-Open Application No. Heisei 3-205325 has proposed a technique wherein the surface of a piece of lead-containing crystal glass tableware is covered with a protective film which contains silicon oxide as a principal component. However, since the technique requires secondary working after working of glass, a rise of the production cost cannot be avoided.

Another technique has been proposed and is disclosed in Japanese Patent Laid-Open Application No. Heisei 2-141434 wherein the surface of a crystal glass vessel is covered with a lead-free glass layer. With the technique, however, since two kinds of glass are melted simultaneously and sprayed to the crystal glass vessel to mold the lead-free glass layer, there is a problem in that the molding is low in efficiency and besides presswork cannot be employed and so forth.

A further technique is disclosed in Japanese Patent Laid-Open Application No. Heisei 4-50133 wherein the amount of an alkali metal or metals to be added to the total amount of PbO, an alkali earth metal or metals and ZnO is limited in order to reduce dissolution of lead. However, the reduction reached is only about one half.

SUMMARY OF THE INVENTION

It is an object of the present invention to provide a novel glass composition which exhibits such characteristics of lead-containing crystal glass that "it is massive", that "it is high in light refraction index and high in dispersion value" and that "it melts readily" to a degree equal to or higher than that of conventional lead-containing crystal glass while it does not contain lead at all.

In order to attain the object described above, according to an aspect of the present invention, there is provided a glass composition, which comprises $SiO_2$ and $K_2O$ as principal components, 5 to 8 percent by weight of $TiO_2$ and 10 to 15 percent by weight of BaO.

The content of $SiO_2$ may be 50 to 60 percent by weight and the content of $K_2O$ may be 5 to 13 percent by weight.

According to another aspect of the present invention, there is provided a glass substrate, which comprises, based on the whole weight of the composition, 50 to 60 percent of $SiO_2$, 5 to 13 percent of $K_2O$, 5 to 8 percent of $TiO_2$, 10 to 15 percent of BaO, 5 to 10 percent of ZnO, 3 to 10 percent of $Na_2O$, 1 to 5 percent of CaO, and 0.3 to 0.8 percent of $Sb_2O_3$.

The glass substrate may further comprise, based on the whole weight of the composition, 0 to 1.0 percent of $Li_2O$, 0 to 2.0 percent of $ZrO_2$ and 1.0 to 2.0 % of $B_2O_3$.

The contents of the components given above are listed up in Table 1 below. It is to be noted that representations of % in the following description are all represented in percent by weight.

TABLE 1

| Component | Content wt % |
|---|---|
| $SiO_2$ | 50.0–60.0 |
| CaO | 1.0–5.0 |
| BaO | 10.0–15.0 |
| $Na_2O$ | 3.0–10.0 |
| $K_2O$ | 5.0–13.0 |
| $Li_2O$ | 0–1.0 |
| $TiO_2$ | 5.0–8.0 |
| ZnO | 5.0–10.0 |
| $ZrO_2$ | 0–2.0 |
| $B_2O_3$ | 1.0–2.0 |
| $Sb_2O_3$ | 0.3–0.8 |

With the glass composition of the present invention, $TiO_2$ and BaO are used as raw materials substituted for PbO, and the refraction index and the dispersion value of light are increased by $TiO_2$ while the density and the refraction index are increased by BaO.

$TiO_2$ is effective to increase the refractive index and increase the dispersion value (decrease the Abbe number) and is essential as a substitute for PbO in the present invention. Where $TiO_2$ is less than 5.0 %, the target values of the refraction index and the dispersion value cannot be achieved. On the other hand, where $TiO_2$ exceeds 8.0 %, the tendency that the color becomes yellowish increases significantly, and this is not preferable with crystal glass with which importance is attached to the transparency.

If $SiO_2$ is less than 50.0 %, then the glass composition is inferior In chemical durability, but if $SiO_2$ exceeds 60.0 %, then it is necessary to raise the melting temperature of the glass composition and the density of the glass composition is decreased. While both of BaO and CaO can be employed as an alkali earth metal, preferably BaO is used in order to assure a high density and a high refraction index. Where BaO is less than 10.0 %, the target value of the density of 2.90 g/cm³ or more cannot be achieved. Where BaO exceeds 15.0 %, it is difficult to perform defoaming and the erosion to the furnace material is marked, and accordingly, it is difficult to melt the glass composition. While CaO is effective to lower the viscosity of the glass composition at a high temperature, it is suitably contained by 1.0 to 5.0 % in order to assure a high solidifying rate in an operating temperature region.

Alkali components, that is, $K_2O$, $Na_2O$ and $Li_2O$ are used to lower the melting temperature. Particularly, $K_2O$ is effective and important to suppress development of a color of Fe ions which are an impurity in the glass. The effect is low where $K_2O$ is less than 5.0 %, but where it exceeds 13.0 %, the erosion to the refractory material is remarkable. $Na_2O$ must necessarily be contained by at least 3.0 % in order to make up for the effect to lower the melting temperature. Where a total amount of $K_2O$ and $Na_2O$ exceeds 18.0 %, the chemical durability of the glass is degraded, and accordingly, it must necessarily be restricted to or lower than 18.0 %. $Li_2O$ has a high effect to lower the melting temperature by addition of a small amount and is sufficient if it is contained by 1.0 % or less.

ZnO is effective to increase the chemical durability without increasing the hardness of the glass, moderate the viscosity-temperature curve and facilitate the molding operability. The amount of addition is sufficient within the range of 5.0 % to 10.0 %.

Since $B_2O_3$ is effective to lower the melting temperature without increasing the coefficient of thermal expansion by addition of a small amount, it is added by 1.0 to 2.0 %.

$Sb_2O_3$ has an effect as a defoaming agent in a composition melted at a low temperature even with a small amount of 0.3 to 0.8 %.

While $ZrO_2$ is added in order to raise the chemical durability, since it increases the hardness of the glass, it is not preferable with crystal glass, which is in most cases worked by cutting or polishing, and accordingly, the amount of addition of it must be restricted to the minimum.

Due to such actions of the components as described above, a glass composition can be obtained which sufficiently satisfies such requirements for crystal glass that ① the density as physical data which represents a massiveness is 2.90 g/cm³ or more;
② the refraction index Nd is 1.55 or more;
③ the Abbe number as physical data representative of dispersion is 47 or less;
④ the glass composition can be melted readily at a low temperature of 1,370° to 1,380 ° C.; and
⑤ the coefficient of thermal expansion can be made lower than $100 \times 10^{-7}/°$ C. taking it into consideration that the glass composition is used frequently for tableware.

It is to be noted that it is naturally possible to add a coloring agent such as chromium oxide by a small amount to produce colored crystal glass.

As described above, according to the present invention, crystalline glass which has a density, a refractive index and a dispersion value equal to or higher than those of conventional lead-containing crystal glasses can be obtained although it does not contain lead at all. Further, the raw materials are comparatively inexpensive and can be melted at a comparatively low temperature, and accordingly, the glass composition can be produced economically.

When it is considered that the regulations to lead are forecast to become progressively severe not only from the problem of dissolution from glassware but also to the operation environment and the environmental pollution caused by dust and fumes scattered at different steps from mixing of raw materials to a blast furnace, the advantage of the glass composition that lead which is very high in toxicity is not contained at all is very significant.

DETAILED DESCRIPTION OF THE PREFERRED EMBODIMENTS

Samples of Example 1 to Example 7 mixed so as to obtain such glass compositions as listed in Table 2 were individually put into platinum pots and melted for about 6 hours at the temperature of 1,375 ° C. in an electric furnace. Thereafter, the pots were taken out, and the molten glass materials were flown out onto a steel plate and then cooled gradually in a lehr. Then, samples for measurement were cut away, and the density, the refraction index, the Abbe number and the coefficient of thermal expansion of each of the samples were measured. Results of the measurements are listed in Table 2. In Table 2, Ex. 1 to Ex. 7 represent Example 1 to Example 7, respectively.

It is to be noted that conventional exemplary lead-containing crystal glass has a density of 2.95 to 3.00 g/cm³, a refractive index Nd of 1,555 to 1,565, an Abbe number of 45 to 47 and a coefficient of thermal expansion of 96 to $100 \times 10^{-7}/°$ C.

TABLE 2

| Components & Physical Data | Ex. 1 | Ex. 2 | Ex. 3 | Ex. 4 | Ex. 5 | Ex. 6 | Ex. 7 |
| --- | --- | --- | --- | --- | --- | --- | --- |
| $SiO_2$ | 54.95 | 54.60 | 51.15 | 51.80 | 50.10 | 55.50 | 55.20 |
| CaO | 4.00 | 3.50 | 5.00 | 4.00 | 3.00 | 1.50 | 1.50 |
| BaO | 12.00 | 12.50 | 14.00 | 13.00 | 14.50 | 13.00 | 13.30 |
| $Na_2O$ | 3.00 | 3.50 | 3.00 | 5.00 | 3.00 | 6.00 | 9.50 |
| $K_2O$ | 9.00 | 10.00 | 11.00 | 8.00 | 12.50 | 7.00 | 5.00 |
| $Li_2O$ | 0.50 | 0.50 | 0.50 | 0.50 | 0.50 | | |
| $TiO_2$ | 7.50 | 7.00 | 5.00 | 8.00 | 7.00 | 6.50 | 5.00 |
| ZnO | 7.50 | 8.00 | 7.50 | 8.00 | 7.00 | 9.00 | 9.00 |
| $ZrO_2$ | | 1.00 | 1.00 | | 1.00 | | |
| $B_2O_3$ | 1.25 | 1.00 | 1.50 | 1.30 | 1.00 | 1.00 | 1.00 |
| $Sb_2O_3$ | 0.30 | 0.40 | 0.35 | 0.40 | 0.40 | 0.50 | 0.50 |
| Density (g/cm³) | 2.885 | 2.908 | 2.951 | 2.940 | 2.955 | 2.902 | 2.906 |
| Refraction Index Nd | 1.589 | 1.590 | 1.588 | 1.600 | 1.601 | 1.582 | 1.577 |
| Abbe Number | 46.5 | 46.8 | 48.2 | 45.5 | 46.5 | 47.0 | 47.0 |
| Coefficient of Thermal Expansion | 92.6 | 97.0 | 101.4 | 98.3 | 105.5 | 94.3 | 99.5 |

TABLE 2-continued

| Components & Physical Data | Ex. 1 | Ex. 2 | Ex. 3 | Ex. 4 | Ex. 5 | Ex. 6 | Ex. 7 |
|---|---|---|---|---|---|---|---|
| ($\times 10^{-7}/°C$.) | | | | | | | |

Having now fully described the invention, it will be apparent to one of ordinary skill in the art that many changes and modifications can be made thereto without departing from the spirit and scope of the invention as set forth herein.

What is claimed is:

1. A glass composition comprising, based on the whole weight of the composition, 50 to 60 percent by weight of $SiO_2$, 5 to 13 percent by weight of $K_2O$, 5 to 8 percent by weight of $TiO_2$, 12 to 15 percent by weight BaO, 5 to 10 percent by weight of ZnO, 3 to 10 percent by weight of $Na_2O$, 1 to 5 percent by weight of CaO, and 0.3 to 0.8 percent by weight of $Sb_2O_3$.

2. A glass composition as claimed in claim 1, further comprising, based on the whole weight of the composition, 0 to 1.0 percent of $Li_2O$, 0 to 2.0 percent of $ZrO_2$ and 1.0 to 2.0% of $B_2O_3$.

* * * * *